United States Patent [19]
Metro

[11] 3,886,615
[45] June 3, 1975

[54] TOE GUARD FOR A DOCKBOARD
[75] Inventor: Robert D. Metro, Brookfield, Wis.
[73] Assignee: Kelley Company, Inc., Milwaukee, Wis.
[22] Filed: July 8, 1974
[21] Appl. No.: 486,413

[52] U.S. Cl. .................................................. 14/71
[51] Int. Cl. ........................................... B65g 11/00
[58] Field of Search .............. 14/71, 72; 52/72, 200; 49/33, 38, 39, 131

[56] References Cited
UNITED STATES PATENTS
| | | | |
|---|---|---|---|
| 1,715,903 | 6/1929 | Dame | 49/33 X |
| 2,602,944 | 7/1952 | Richardson | 14/71 |
| 2,689,965 | 9/1954 | Fenton | 14/71 |
| 2,846,703 | 8/1958 | Adley | 14/71 |
| 3,255,478 | 6/1966 | Lambert | 14/71 |
| 3,280,414 | 10/1966 | Layne | 14/71 |
| 3,456,274 | 7/1969 | McGuire | 14/71 |
| 3,584,324 | 6/1971 | Merrick | 14/71 |

*Primary Examiner*—Nile C. Byers, Jr.
*Attorney, Agent, or Firm*—Andrus, Sceales, Starke and Sawall

[57] ABSTRACT

A toe guard for an adjustable pit mounted dockboard. The toe guard comprises a vertical plate disposed along the side edge of the ramp of the dockboard and is pivotally connected to the rear end of the ramp. The ramp is provided with a projection which is adapted to engage an abutment on the toe guard as the ramp is elevated above dock level to thereby pivot the toe guard upwardly and enclose the space between the side edge of the inclined ramp and the dock. The connection between the ramp and the toe guard is arranged so that when the ramp is moved downwardly to a below dock level position the ramp will move relative to the toe guard.

15 Claims, 6 Drawing Figures

PATENTED JUN 3 1975　　3,886,615

SHEET 1

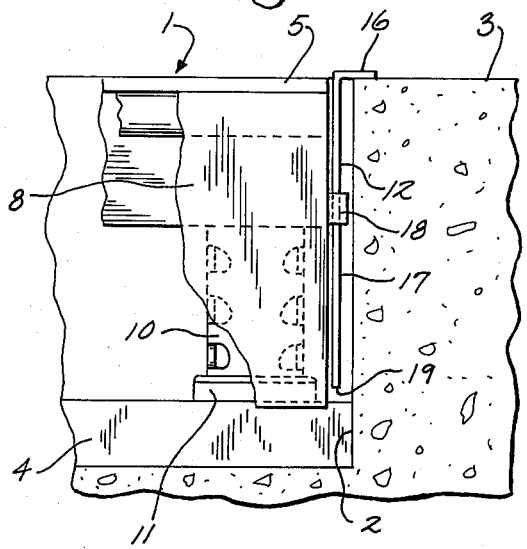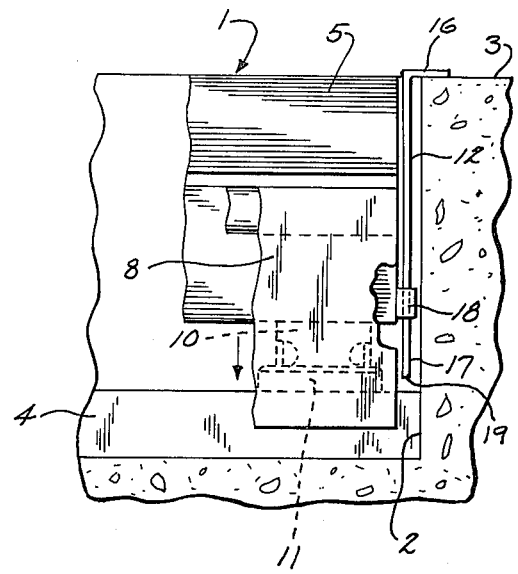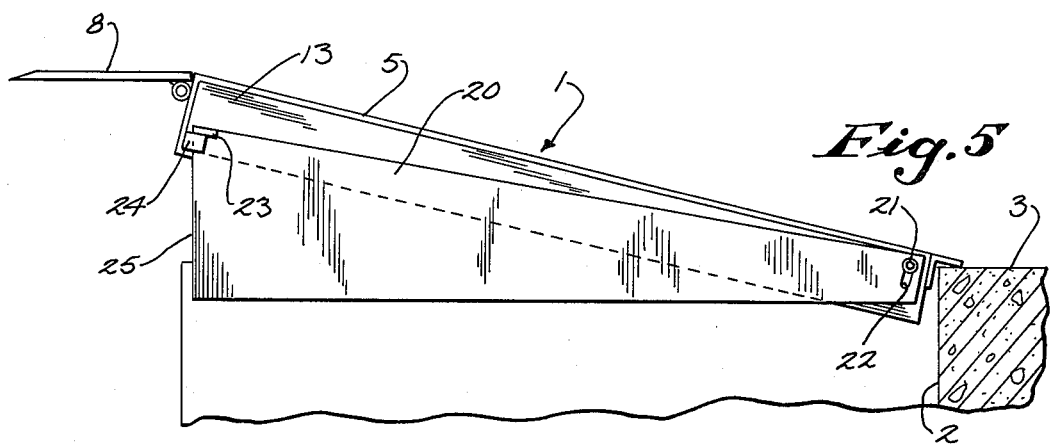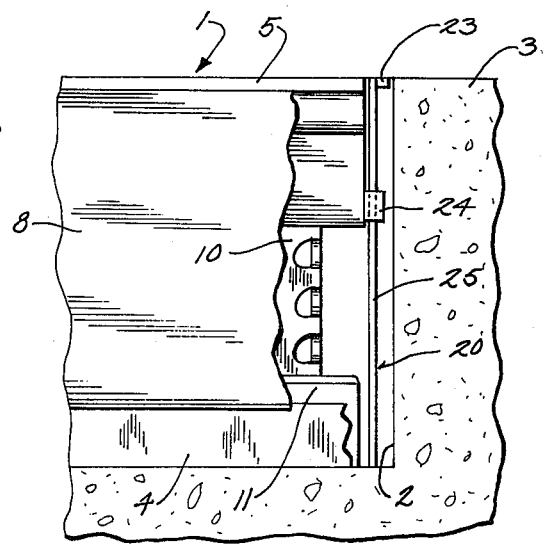

TOE GUARD FOR A DOCKBOARD

BACKGROUND OF THE INVENTION

There are several common types of pit mounted dockboards including upwardly-biased mechanical dockboards, downwardly-biased mechanical dockboards and hydraulic operated dockboards. In all dockboards of this type, the ramp is hinged at its rear edge to the dock and at various times during the operation cycle, the ramp may be at an upwardly inclined, above dock level position. With the ramp above dock level, there is a space between the side edges of the inclined ramp and the dock, and if the operator's toes or other object is inadvertantly inserted within the space, they can be severly crushed by the scissors action when the ramp is lowered toward a dock level position.

To protect against this type of injury, toe guards have been employed in the past and have been secured to the side edges of the ramp so that they enclose the space between the ramp and the dock when the ramp is in the inclined elevated position.

A pit mounted dockboard can, during its operation, move to a downwardly inclined, below dock level position, due to the fact that in many cases the bed of the truck or carrier may be at a below dock level position. If a toe guard is secured to the ramp and is of suitable height to give full protection at maximum elevation of the ramp, which is generally about 24 to 25 inches, it will strike the bottom of the pit when the ramp moves to a below dock level position.

Thus, toe guards which have been fixed to the ramp have been of a minimum height and have not provided full protection at maximum elevation of the ramp.

To overcome this problem, attempts have been made in the past to provide a folding or telescopic toe guard which will provide full protection when the ramp is elevated and will contract or telescope when the ramp is moved downwardly to a below dock level position. A typical toe guard of the folding type is disclosed in U.S. Pat. No. 3,280,414.

For the most part the folding or telescopic toe guards as used in the past, have been complicated in construction, requiring several sections and connections, and been susceptible to damage by mechanical handling equipment.

SUMMARY OF THE INVENTION

The invention relates to an improved toe guard for a pit mounted dockboard which provides full protection at maximum elevation of the ramp and also enables the ramp to be lowered without interference to a below dock level position. The toe guard of the invention comprises a single vertical plate which is mounted along the side edge of the ramp and is pivoted to the rear edge of the ramp. In the preferred form of the invention, the upper edge of the toe guard is provided with a laterally extending flange which is adapted to rest on the upper surface of the dock when the ramp is at a dock level position. Connected to the forward edge of the ramp is a U-shaped bracket which receives the forward edge of the toe guard. The U-shaped bracket is located adjacent the lower edge of the side surface of the ramp and when the ramp is at a dock level position the bracket is spaced a substantial distance beneath the flange on the toe guard.

When the ramp is elevated, the U-shaped bracket will ride upwardly along the forward edge of the toe guard until it engages the flange, and then continued upward movement of the ramp will pivot the toe guard upwardly with the ramp movement. The toe guard has a height so that at the maximum inclined position of the ramp, the toe guard will fully enclose the space between the inclined ramp and the dock.

When the ramp moves downwardly from the upwardly inclined position to a below dock level position, the toe guard will move downwardly by gravity with the ramp until the flange on the toe guard engages the upper surface of the dock, thereby providing a stop for further downward movement of the toe guard. The ramp can move downwardly to a below dock level position relative to the toe guard with the U-shaped bracket sliding on the forward edge of the toe guard, thereby permitting the ramp to assume a downwardly inclined, below dock level position without interference from the toe guard.

As the toe guard is a one-piece structure, it is less expensive to manufacture and install than conventional toe gurards. Furthermore, the toe guard can be fabricated from a relatively heavy plate and thus is less susceptible to damage than commonly used toe guards.

The flange on the upper end of the toe guard not only provides a stop to limit downward movement of the toe guard, but also provides a weather and rodent seal which encloses the joint or gap between the ramp and the dock when the ramp is in the horizontal cross traffic position.

Other objects and advantages will appear in the course of the following description.

DESCRIPTION OF THE DRAWINGS

The drawings illustrate the best mode presently contemplated of carrying out the invention.

In the drawings:

FIG. 3 is a fragmentary front elevation with the ramp in the dock level position;

FIG. 4 is a view similar to FIG. 3 showing the ramp in a below dock level position;

FIG. 5 is a side elevation of a dockboard utilizing a modified form of the toe guard; and FIG. 6 is a fragmentary front elevation of the dockboard shown in FIG. 5.

DESCRIPTION OF THE ILLUSTRATED EMBODIMENT

Figure 1:
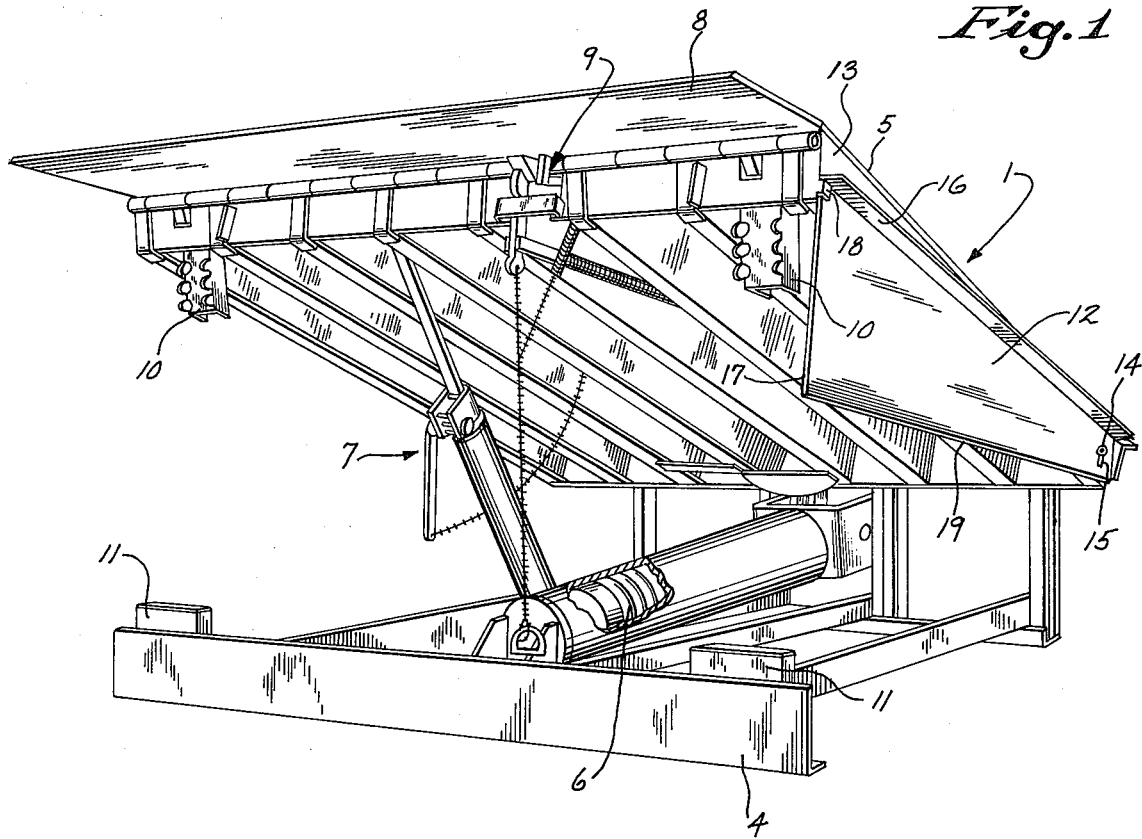
FIG. 1 is a perspective view of a mechanical pit mounted dockboard utilizing the toe guard of the invention.

FIG. 1 illustrates an adjustable mechanical dockboard 1 which is mounted within a pit or depression 2 in a loading dock 3.

The dockboard 1 includes a frame or supporting structure 4 and a ramp 5 is hinged at its rear edge to the frame and is adapted to be pivoted vertically between a generally horizontal or cross traffic position, an upwardly inclined position as shown in FIG. 1, and a downwardly inclined below dock level position, as shown in FIG. 4.

The dockboard 1, as illustrated in FIG. 1, is an upwardly biased type in which a spring assembly 6, such as that shown in U.S. Pat. No. 3,528,118, is utilized to urge the ramp to an upwardly inclined position as shown in FIG. 1. A hold-down mechanism, indicated generally by 7, is employed to lock the ramp at any given elevation and counteract the action of the spring assembly 6. By manually releasing the hold-down mechanism 7, the spring assembly 6 will act to pivot the ramp to the upwardly inclined position.

Hinged to the front edge of the ramp is an extension lip 8 which is movable between a downwardly hanging pendant position and an extended position where the lip forms an extension to the upper surface of the ramp 5. The lip is moved between the pendant position and the extended position by a lip lifting and locking mechanism indicated generally by 9, as disclosed in U.S. Pat. No. 3,117,332.

The ramp is supported in the cross traffic position by engagement of a pair of cross traffic legs 10 with supports 11 which are mounted on the frame 4. The cross traffic legs, as described in U.S. Pat. No. 3,137,017, are adapted to be retracted so that the ramp 5 can move to a below dock level position and a series of abutments on the cross traffic legs will serve to support the ramp in a series of below dock level positions.

In accordance with the invention, a toe guard is associated with each side of the ramp and comprises a plate 12 which is mounted flatwise to the side surface 13 of the ramp 5. The rear end of each plate 12 is pivotally connected to the ramp by means of a bolt 14 which extends outwardly from the side surface 13 and extends through a slot 15 in plate 12.

Figure 2:
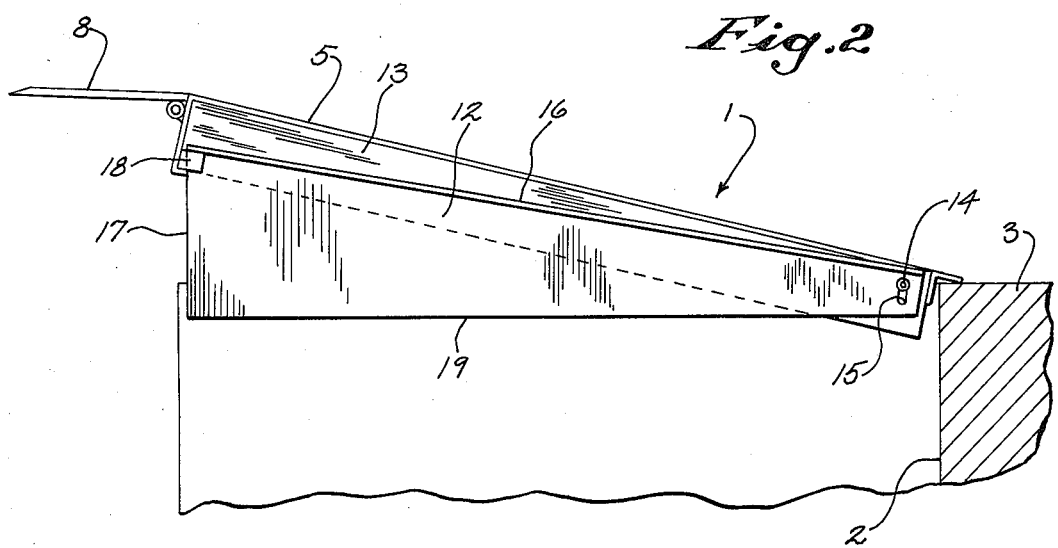
FIG. 2 is a side elevation of the dockboard with the ramp in the upwardly inclined position.

Extending laterally outward from the upper edge of the toe guard 12 is a flange 16 which is adapted to rest on the upper surface of the dock 3 when the ramp is in the cross traffic position, as shown in FIG. 3. The inclined front edge 17 of plate 12 is slidably received within the open end of a generally U-shaped bracket 18, attached to the front lower corner of side surface 13 of the ramp. The lower edge 19 of toe guard 12 is disposed at an angle with respect to the flange 16, so that when the ramp 5 is in maximum elevated position, as shown in FIG. 2, the lower edge 19 will be located slightly below dock level and will be generally parallel to the upper surface of the dock.

When the ramp 5 is at a horizontal dock level position, the flange 16 will rest on the upper surface of the dock as shown in FIG. 3, and the U-shaped bracket 18 will be located a substantial distance beneath the flange. As the ramp is elevated the U-shaped bracket 18 will move relative to the toe guard 12 until the bracket engages the flange 16. Further upward movement of the ramp will cause the toe guard 12 to move upward with the ramp movement until the ramp reaches its position of maximum elevation as shown in FIG. 1. In this position the lower edge 19 of the toe guard 12 is just slightly below dock level thereby providing complete protection from objects being inadvertently inserted in the space between the inclined ramp and the dock.

When the ramp is lowered from the elevated position to a dock level position, the flange 16 will engage the upper surface of the dock thereby serving as a stop to prevent further downward movement of the toe guard 12. However, due to the sliding connection between the U-shaped bracket and the edge 17 of plate 12, the ramp can move downwardly to a below dock level position without interference from the toe guard 12, as shown in FIG. 4.

The slotted connection provided by the bolt 14 and slot 15 enables the toe guard 12 to move upwardly in the event an object is inadvertently positioned beneath the flange as the toe guard is lowered. Thus, with the slotted connection, any object inadvertently inserted beneath the flange will not be pinched, but instead the flange and toe-guard will move upwardly to accomodate the object.

The flange 16 provides an abutment to be engaged by the projection or bracket 18 on the ramp to carry the toe guard upwardly, and also functions as a stop to engage the upper surface of the dock and limit downward movement of the toe guard. While the drawings show the flange 16 extending continuously the length of the toe guard, this is not essential, although a continuous flange acts to partially seal the crack or joint between the side edge of the ramp and the loading dock, thereby providing protection against wind blasts, as well as rodent protection. The flange 16, is desired, can be formed of a flexible material, such as rubber or plastic, so that it will more readily conform to the dock surface and enhance the seal.

FIGS. 5 and 6 illustrate a modified form of the invention which includes a toe guard 20, similar to toe guard 12 of the first embodiment. The rear end of the toe guard 20 is pivotally connected to the side surface 13 of the ramp 5 by means of a bolt 21 which extends through a slot 22 in the toe guard.

An abutment 23 is formed on the upper edge of the toe guard 20 and is adapted to be engaged by a U-shaped bracket 24, similar in structure and operation to U-shaped bracket 18 of the first embodiment, as the ramp is elevated. As shown in FIG. 6, the bracket 24 is located a substantial distance beneath the abutment 23 when the ramp is at a dock level position.

Toe guard 20 has an inclined front edge 25 which is slidably received within the U-shaped bracket 24 as previously described.

When the ramp 5 is elevated the U-shaped bracket 24 will move upwardly with the ramp until it engages the abutment 23, and continued upward movement of the ramp will thereby cause the toe guard 20 to raise with the ramp to provide full protection at maximum ramp elevation.

As the ramp is moved downwardly, the toe guard 20 will move by gravity with the ramp until the lower end 26 of the toe guard engages the bottom of the pit 2, thereby providing a stop against further downward movement of the toe guard. Due to the sliding connection between the U-bracket 24 and the edge 25, the ramp can continue downwardly to a below dock level position without interference from the toe guard 20.

In the elevated position of the ramp, the upper edge of the forward portion of the toe guard is just slightly above the lower edge of the ramp, so that there is a minimum overlap between ramp surface 13 and the toe guard 20 in the inclined position.

The sliding connection between the U-bracket and the toe guard permits the ramp to move relative to the toe guard to a below dock level position. Thus, the toe guard can be constructed with a height approximately equal to the depth of the pit, generally about 24 inches, and the 24 inch height of the toe guard will provide complete toe guard protection in the elevated position of the ramp.

As the toe guard is composed of a single rigid plate, it is less susceptible to damage from mechanical handling equipment than prior types of toe guards which were constructed of several interconnected folding or telescopic pieces.

With the use of the flange 16 which extends the full length of the ramp an improved weather and rodent seal is obtained.

While the above description has illustrated the toe guard plate as associated with an upwardly biased mechanical dockboard, it is contemplated that the toe guard can be utilized with any type of pit mounted, vertically pivotable, dockboard.

Various modes of carrying out the invention are contemplated as being within the scope of the following claims particularly pointing out and distinctly claiming the subject matter which is regarded as the invention.

I claim:

1. A toe guard for a dockboard having a ramp hinged at its rear edge to the dock and movable from a horizontal cross traffic position to an upwardly inclined position and to a downwardly inclined below dock level position, said ramp having a side surface, said toe guard comprising a plate disposed generally flatwise to said side surface, pivotal means for pivotally mounting the rear end of the plate for movement in a vertical plane relative to the ramp, first abutment means on the ramp, second abutment means connected to said plate and disposed to be engaged by said first abutment means on upward movement of the ramp, said first abutment means being spaced a substantial distance below second abutment means when the ramp is at a horizontal dock level position, said abutments being disposed with respect to each other so that on initial upward movement of the ramp the plate will not move with the ramp and on further upward movement of the ramp said first abutment means will engage said second abutment to thereby pivot the plate upwardly with the ramp, and stop means disposed to be engaged by the plate as the ramp moves downwardly toward the horizontal position to limit further downward movement of the plate, said ramp being movable relative to said plate to said below dock level position.

2. The toe guard of claim 1, and including third abutment means on said plate and disposed to engage said stop means to limit downward movement of the plate.

3. The toe guard of claim 2, wherein said third abutment comprises a flange extending outwardly from the upper edge of said plate.

4. The toe guard of claim 3, wherein said flange extends continuously the length of the plate.

5. The toe guard of claim 1, wherein said first abutment means comprises a generally U-shaped bracket connected to the ramp and having an open end facing rearwardly, the forward edge of said plate being slidably received within said U-shaped bracket.

6. The toe guard of claim 5, wherein the forward edge of the plate extends rearwardly and downwardly with respect to the upper edge of the plate.

7. The toe guard of claim 1, wherein said pivotal means includes a slotted connection disposed to permit the rear end of the plate to move vertically relative to the ramp.

8. A toe guard for a dockboard having a ramp hinged at its rear edge to the dock and movable from a horizontal cross traffic position to an upwardly inclined position and to a downwardly inclined below dock level position, said ramp having a side surface, said toe guard comprising a generally vertical plate disposed generally flatwise to said side surface, pivotal means connected to the rear end of the plate for mounting the plate for vertical pivotal movement, flange means on the upper edge of the plate and extending laterally outward from the ramp and disposed to rest on the upper surface of the dock when the ramp is at the dock level position, a bracket secured to said side surface and having an open end facing rearwardly, the forward edge of said plate being slidably received within said bracket, upward movement of said ramp causing said bracket to engage said flange to thereby pivot the plate upwardly in accordance with upward movement of the ramp, downward movement of the ramp to a below dock level position causing said flange to engage the upper surface of the dock to limit further downward movement of the plate, the sliding connection of said bracket for the forward edge of the plate enabling the ramp to move to a below dock level position relative to said plate.

9. The toe guard of claim 8, wherein said bracket is connected to the lower edge portion of the side surface.

10. The toe guard of claim 8, wherein the flange extends continuously the length of the plate.

11. In combination, a loading dock having an upper loading surface and a forward vertical surface, said dock having a pit located at the junction of the upper surface and vertical surface, a dockboard mounted in the pit and including a supporting structure and a ramp structure hinged at its rear edge to the supporting structure and movable from a generally horizontal dock level position to an upwardly inclined position and to a downwardly inclined below dock level position, said ramp structure having a generally vertical side surface, a toe guard plate disposed generally flatwise to said side surface, pivotal means for pivotally mounting the rear end portion of the toe guard to one of said structures, first abutment means on said ramp structure, sedond abutment means on said plate disposed to be engaged by said first abutment means on upward elevation of said ramp structure, said first abutment means being spaced a substantial distance below the second abutment means when the ramp structure is at the horizontal dock level position, said first and second abutment means being arranged so that on initial upward movement of the ramp structure, the plate will not be moved upwardly with the ramp structure, and on continued upward movement of the ramp structure the first abutment means will engage the second abutment means to thereby pivot the plate upwardly with upward movement of the ramp structure, third abutment means on said plate, and stop means disposed to be engaged by said third abutment means as the ramp structure is lowered toward a dock level position, engagement of said third abutment means with said stop means preventing further downward movement of the plate and enabling the ramp structure to move to a below dock level position relative to said plate.

12. The combination of claim 11, wherein said second abutment means comprises a flange extending laterally from the upper edge of said plate.

13. The combination of claim 11, wherein said stop means comprises the upper surface of the dock and said third abutment means comprises an outwardly extending flange on the upper edge of said plate.

14. The combination of claim 11, wherein said pivotal means is disposed adjacent the upper edge of the side surface and said first abutment means is disposed adjacent the lower edge of said side surface.

15. The combination of claim 11, wherein said stop means comprises the bottom of the pit and said third abutment means comprises the bottom edge of said plate.

* * * * *